US009472241B2

(12) United States Patent
Keohane et al.

(10) Patent No.: US 9,472,241 B2
(45) Date of Patent: *Oct. 18, 2016

(54) IDENTIFYING AND RERECORDING ONLY THE INCOMPLETE UNITS OF A PROGRAM BROADCAST RECORDING

(71) Applicant: GLOBALFOUNDRIES INC., Grand Cayman (KY)

(72) Inventors: Susann M. Keohane, Austin, TX (US); Shawn P. Mullen, Buda, TX (US); Jessica C. Murillo, Round Rock, TX (US); Johnny M. Shieh, Austin, TX (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 332 days.

This patent is subject to a terminal disclaimer.

(21) Appl. No.: 14/021,590

(22) Filed: Sep. 9, 2013

(65) Prior Publication Data

US 2015/0071611 A1    Mar. 12, 2015

(51) Int. Cl.
| | |
|---|---|
| *H04N 5/94* | (2006.01) |
| *G11B 27/36* | (2006.01) |
| *G11B 20/10* | (2006.01) |
| *G11B 27/029* | (2006.01) |

(Continued)

(52) U.S. Cl.
CPC ............... *G11B 27/36* (2013.01); *G11B 20/10* (2013.01); *G11B 27/029* (2013.01); *G11B 27/036* (2013.01); *H04N 5/781* (2013.01); *H04N 9/804* (2013.01); *H04N 21/4334* (2013.01); *H04N 21/4425* (2013.01); *H04N 21/8456* (2013.01)

(58) Field of Classification Search
CPC ............................ H04N 5/8042; G11B 27/34
USPC ................. 386/263, 278, 286–288; 348/181; 725/58
See application file for complete search history.

(56) References Cited

U.S. PATENT DOCUMENTS

| | | | |
|---|---|---|---|
| 6,681,396 B1 | 1/2004 | Bates et al. | |
| 8,358,911 B2 | 1/2013 | Nguyen et al. | |

(Continued)

FOREIGN PATENT DOCUMENTS

EP    2590423 A2    5/2013

OTHER PUBLICATIONS

U.S. Appl. No. 14/098,896, filed Dec. 6, 2013, In re Susann M. Keohane, International Business Machines Corporation, 49 pages.

(Continued)

*Primary Examiner* — Thai Tran
*Assistant Examiner* — Mishawn Hunter
(74) *Attorney, Agent, or Firm* — DeLio, Peterson & Curcio, LLC; David R. Pegnataro

(57) ABSTRACT

Each data integrity value, from among a plurality of data integrity values each associated with a separate unit of a program comprising a plurality of units, is checked against a separate recorded portion of a recording of the program corresponding to one of the plurality of units, wherein the recording of the program is recorded from a broadcast of the program. Responsive to a particular data integrity value from among the plurality of data integrity values not matching when checked against a particular separate recorded portion of the program corresponding to a particular unit from among the plurality of units, the recording is corrected by replacing only the particular separate recorded portion of the program from a second recording of only the particular unit from a subsequent broadcast of the program.

11 Claims, 7 Drawing Sheets

(51) Int. Cl.
*H04N 5/781* (2006.01)
*H04N 9/804* (2006.01)
*H04N 21/433* (2011.01)
*H04N 21/4425* (2011.01)
*H04N 21/845* (2011.01)
*G11B 27/036* (2006.01)

(56) References Cited

U.S. PATENT DOCUMENTS

| | | | |
|---|---|---|---|
| 2003/0219228 A1 | 11/2003 | Thaigarajan et al. | |
| 2007/0065105 A1* | 3/2007 | Chao | G11B 27/3027 386/264 |
| 2007/0092203 A1* | 4/2007 | Iwata | H04N 21/2747 386/299 |
| 2007/0104457 A1* | 5/2007 | Jeong | G11B 27/034 386/263 |
| 2009/0102926 A1 | 4/2009 | Bhogal et al. | |
| 2012/0288258 A1 | 11/2012 | Ellis et al. | |

OTHER PUBLICATIONS

USPTO Office Action, mailing date May 18, 2015, U.S. Appl. No. 14/098,896, filed Dec. 6, 2013, In re Susann M. Keohane, International Business Machines Corporation, 17 pages.

* cited by examiner

IDENTIFYING AND RERECORDING ONLY THE INCOMPLETE UNITS OF A PROGRAM BROADCAST RECORDING

BACKGROUND

1. Technical Field

This invention relates in general to recording programs and more particularly to identifying and rerecording only the incomplete units of a recording of a previous broadcast of a program.

2. Description of the Related Art

Television broadcast subscribers and other broadcast program subscribers typically have an option to add a recording device, such as a digital video recorder (DVR) device, to receive and record programs as the programs are broadcast. Many recording devices are also programmable, such that a user may pre-program the recording device to record programs during scheduled broadcast times. Recordings of program broadcasts by recording devices may be incomplete, or otherwise compromised, by errors introduced by the program receiver, errors introduced by the recording device, errors in the broadcast equipment, and errors in the broadcast transmission.

BRIEF SUMMARY

When errors are introduced into the recording of a program broadcast, the errors may only impact portions of the recorded program, not the entire program recording. In view of the foregoing, there is a need for a method, system, and program product for identifying and rerecording only the incomplete units of a recording of a previous broadcast of a program.

In one embodiment, a system for managing program recordings includes a computer, comprising at least one processor, configured to check each data integrity value, from among a plurality of data integrity values each associated with a separate unit of a program comprising a plurality of units, against a separate recorded portion of a recording of the program corresponding to one of the plurality of units, wherein the recording of the program is recorded from a broadcast of the program. The system includes the computer, responsive to a particular data integrity value from among the plurality of data integrity values not matching when checked against a particular separate recorded portion of the program corresponding to a particular unit from among the plurality of units, configured to select to correct the recording by replacing only the particular separate recorded portion of the program from a second recording of only the particular unit from a subsequent broadcast of the program.

In another embodiment, a computer program product for managing program recordings includes one or more computer-readable tangible storage devices. The computer program product includes program instructions, stored on at least one of the one or more storage devices, to check each data integrity value, from among a plurality of data integrity values each associated with a separate unit of a program comprising a plurality of units, against a separate recorded portion of a recording of the program corresponding to one of the plurality of units, wherein the recording of the program is recorded from a broadcast of the program. The computer program product includes program instructions, stored on at least one of the one or more storage devices, responsive to a particular data integrity value from among the plurality of data integrity values not matching when checked against a particular separate recorded portion of the program corresponding to a particular unit from among the plurality of units, to select to correct the recording by replacing only the particular separate recorded portion of the program from a second recording of only the particular unit from a subsequent broadcast of the program.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

As described herein, embodiments of the invention provide a solution for identifying and rerecording only the incomplete units of a recording of a previous broadcast of a program segmented into multiple units.

Figure 1:
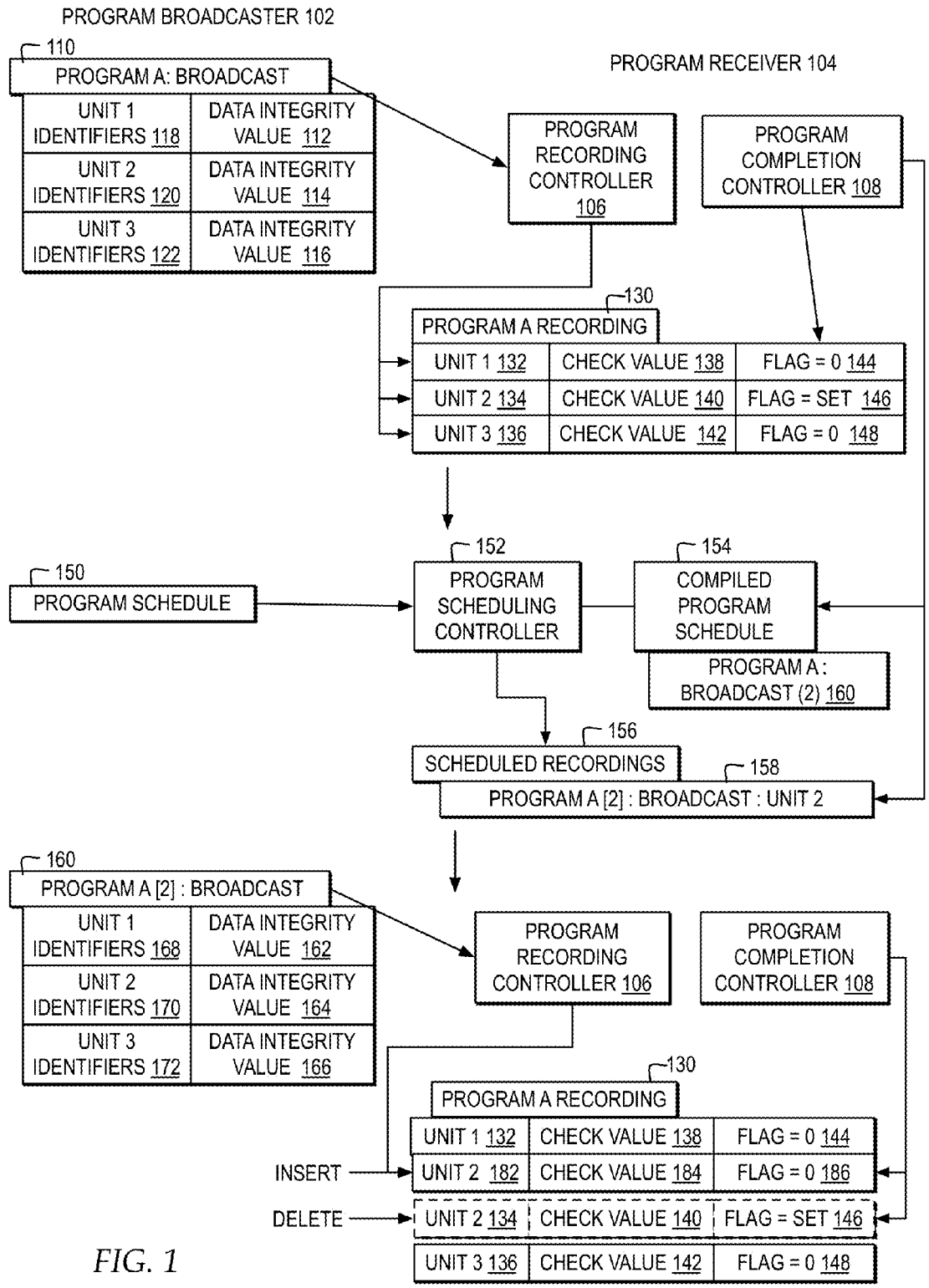
FIG. 1 is a block diagram illustrating one example of a system for identifying and rerecording only the incomplete units of a recording of a previous broadcast of a program.

With reference now to the figures, and in particular with reference now to FIG. 1, a block diagram illustrates one example of a system for identifying and rerecording only the incomplete units of a recording of a previous broadcast of a program. In the example, a program broadcaster 102 broadcasts one or more programs on one or more channels or streams. In the example, among the one or more programs simultaneously broadcast on one or more channels or streams, program broadcaster 102 broadcasts a program identified as "program A" at a first time, illustrated as a broadcast 110.

While a program such as "program A" may be broadcast as a single, seamless, program, program broadcaster 102, or another entity, may identify a program as including multiple, consecutively broadcast, units or chapters, each representing a segment of the program identified by a start time and a stop time, segment duration, unit name or unique number, or other unit identifiers. In the example, "program A" is identified by three consecutively broadcast units identified by unit 1 identifiers 118, unit 2 identifiers 120, and unit 3 identifiers 122. In one example, each unit of a program may represent a separate segment of the program. In another example, units of a program may include segments including overlapping portions of the program. Units of a program may each be set to a same length of time or different lengths of time. In one example, the advertisements included within the program broadcast may be identified as separate units of a program from the units of the program representing non-advertising content of the program. Unit identifiers may also include context or labeling to indicate the type of content within the unit. For example, a unit identifier may specify that the content within the unit is broadcast live, an advertisement, a recap of portions of previous episodes, new episode content, and an end cap of preview portions of shows to be fully broadcast in the future.

In addition, program broadcaster 102, or another entity, may compute and provide a data integrity value for each unit of a program. In one example, in association with broadcast 110 of "program A", program broadcaster 102 may send a data integrity value 112 correlating with the unit identified by unit 1 identifiers 118, a data integrity value 114 correlating with the unit identified by unit 2 identifiers 120, and a data integrity value 116 correlating with the unit identified by unit 3 identifiers 122. In one example, program broadcaster 102 sends unit 1 identifiers 118, unit 2 identifiers 120, and unit 3 identifiers 122, along with data integrity value 112, data integrity value 114, and data integrity value 116, prior to or concurrent with the broadcast of "program A", in response to a communication received from program recording controller 106 indicating that program recording controller 106 is scheduled to or triggered to record program A broadcast 110. In another example, program broadcaster 102 sends pairings of each set of unit identifiers and correlating data integrity value, for each unit, prior to, concurrent with, or subsequent to broadcasting "program A". In one example, the unit identifiers and correlating data integrity values are embedded into the data transmitted during the program broadcast. In another example, the unit identifiers and correlating data integrity values are sent in a transmission separate from the broadcast of a program containing unit identifiers and data integrity values only. In another example, the unit identifiers and data integrity values are sent as part of the information data for the program, such as within the data for a program schedule 150 identifying the scheduled broadcast times and other information about one or more programs scheduled for broadcast by program broadcaster 102. In another example, unit identifiers and data integrity values may be computed, sent, or provided by entities other than program broadcaster 102.

In the example, data integrity value 112, data integrity value 114, and data integrity value 116 may each hold a value representing a checksum or hash sum calculated for the data corresponding to each of the units identified by unit 1 identifiers 118, unit 2 identifiers 120, and unit 3 identifiers 122, respectively. In one example, program broadcaster 102 or another entity may perform a checksum function on each unit of a program to compute a numerical value from the data in each unit, representing the data integrity value for each unit. Each data integrity value is provided for the purpose of detecting errors that may be introduced during the transmission of each unit of a program broadcast or recording and storage of each unit of a program broadcast. The integrity of the data transmitted and recorded in each unit of a program broadcast can be checked by a device receiving and recording each unit of the program broadcast by the device computing a checksum from each received unit and comparing the computed checksum with the data integrity value sent for each unit from among data integrity value 112, data integrity value 114, and data integrity value 116. If the checksum computed by a receiving device for a unit of a program and the data integrity value sent for the unit of the program do not match, then the receiving device may detect an error for the unit of the program.

One or more types of checksum functions may be implemented to calculate each of data integrity value 112, data integrity value 114, and data integrity value 116, and also implemented by receiving devices checking each of the data integrity values against received data units. In general, a checksum function calculates a numerical value from the data in the program unit. In one example, a checksum function, which may be referred to as a parity byte or parity word function, breaks data in each unit into "words" with a fixed number n of bits and computes the exclusive or of all those words, where the exclusive or of all the words is the data integrity value for the unit. In another example, a checksum function, which may be referred to as a modular sum function, breaks data in each unit into the words, adds all the words as unsigned binary numbers, discarding any overflow bits, and sets the total as the data integrity value for each unit. In another example, a checksum function, which may be referred to as a position-dependent checksum, such as Fletcher's checksum or cyclic redundancy checks, calculates a value for each word and also considers the position of each word in a sequence, when calculating a checksum for each data unit to set as the data integrity value for the data unit. One of ordinary skill in the art will appreciate that additional or alternate types of checksum functions may be implemented. In selecting a checksum function to apply, the more accurate or complex the value is that is calculated by the checksum function, the more time or resources that may be required for performing the checksum function to check for errors. A program broadcaster may select to apply a particular checksum function and only send a single checksum value calculated by that checksum function. In addition, a program broadcaster may select to send multiple data integrity values for each unit, where each data integrity value represents a checksum calculated by a different type of checksum function, such that receiving devices may be programmed to apply one of multiple checksum functions depending on the type and amount of resources available for the device to apply a checksum function.

In the example, a program receiver 104 is able to receive program broadcasts from one or more program broadcasters, including program broadcaster 102. In the example, a program recording controller 106 of program receiver 104 may control the recording of one or more programs broadcast by program broadcaster 102. In the example, program recording controller 106 records broadcast 110 of "program A" as a program A recording 130. In one example, program recording controller 106 may select to automatically record a particular program broadcast by program broadcaster 102 according to selections of programs or selections of recording times set in a scheduled recordings list 156. In another example, a user may press a record request button while a program is broadcasting to trigger program recording controller 106 to record the broadcast of the program.

In the example, a program completion controller 108 monitors program A recording 130 to determine, on a unit by unit basis, whether the recording of the broadcast of "program A" is complete. In the example, program completion controller 108 uses the unit identifiers and correlated data integrity value for each unit sent by program broadcaster 102, from among unit 1 identifiers 118 and data integrity value 112, unit 2 identifiers 120 and data integrity value 114, and unit 3 identifiers 122 and data integrity value 116, to check whether the recording of "program A" is complete. In one example, program completion controller 108 detects portions of the recording specified by the unit identifiers, where the portion of program A recording 130 identified as unit 1 132 is specified by unit 1 identifiers 118, unit 2 134 is specified by unit 2 identifiers 120, and unit 3 136 is specified by unit 3 identifiers 122. In the example, program completion controller 108 checks data integrity value 112 against a check value 138 representing a checksum for unit 1 132, checks data integrity value 114 against a check value 140 representing a checksum for unit 2 134, and checks data integrity value 116 against a check value 142 representing a checksum for unit 3 136. In the example, if a data integrity value does not match the check value for a unit, program completion controller 108 sets a flag for the unit. In the example, program completion controller 108 does not set a flag 144 for unit 1 132 and a flag 148 for unit 3 136, but program completion controller 108 sets a flag 146 for unit 2 134, indicating that unit 2 134, the recording of the portion of "program A" identified by unit identifiers 120, is incomplete.

In the example, when program completion controller 108 detects that one or more units of a program are incomplete, program completion controller 108 automatically checks a compiled program schedule 154 containing one or more future program broadcasts, to determine whether the incomplete program or units of the incomplete program are scheduled for a subsequent broadcast time. Programs and program units may be identified in compiled program schedule 154 by program name, program number, or other identifiers. In the example, a program scheduling controller 152 of program receiver 104 manages access to compiled program schedule 154, which may include scheduled program broadcasts by one or more program broadcasters. In one example, program scheduling controller 152 receives program schedule 150 indicating the scheduled program broadcasts by program broadcaster 102. In addition, program scheduling controller 152 may access program scheduling by other program broadcasters and from other entities that provide other recordable sources of programs and program units. In addition, if program completion controller 108 does not detect a rebroadcast of an incomplete program unit scheduled in compiled program schedule 154, program completion controller 108 may automatically trigger program scheduling controller 152 to search all available program media for access to the incomplete program unit, including searching for live streams, downloadable media, on-demand playback media, viewable media, and other recordable sources of the incomplete program unit available at a future time or available instantaneously, and to add any identified options to compiled program schedule 154. In one example, program scheduling controller 152 may use a search engine to search for one or more program host systems, which are able to provide other recordable sources of the incomplete unit of a program, using the name or other identifier for the program or the name or other identifier for the incomplete program unit.

In the example, program completion controller 108 detects a subsequent broadcast 160 of "program A" scheduled in compiled program schedule 154, identified as "program A: broadcast (2)". In the example, responsive to detecting subsequent broadcast 160 in compiled program schedule 164, program completion controller 108 automatically schedules a new scheduled recording 158 of "unit 2", the flagged unit, of "program A" during subsequent broadcast 160, within scheduled recordings 156. Program recording controller 106 automatically records programs and program units according to the entries under scheduled recordings 156.

In the example, program broadcaster 102 broadcasts subsequent broadcast 160 of "program A" at the scheduled time and may also send, in association with subsequent broadcast 160 of "program A", unit identifiers and correlated data integrity values for subsequent broadcast 160 of "program A". In one example, unit 1 identifiers 168, unit 2 identifiers 170, and unit 3 identifiers 172 include the same data included in unit 1 identifiers 118, unit 2 identifiers 120, and unit 3 identifiers 122, respectively and data integrity value 162, data integrity value 164, and data integrity value 166 include the same data included in data integrity value 112, data integrity value 114, and data integrity value 116, respectively. In another example, any of unit 1 identifiers 168, unit 2 identifiers 170, and unit 3 identifiers 172 may include data that is different from the included in unit 1 identifiers 118, unit 2 identifiers 120, and unit 3 identifiers 122, respectively and any of data integrity value 162, data integrity value 164, and data integrity value 166 may include data that is different from the data included in data integrity value 112, data integrity value 114, and data integrity value 116, respectively.

In the example, program recording controller 106 records subsequent broadcast 160 according to new scheduled recording 158, which specifies recording only "unit 2" of "program A", from among the multiple units of "program A", during subsequent broadcast 160. Program recording controller 106 uses unit 2 identifiers 170 to identify the segment of subsequent broadcast 160 specified as "unit 2". From subsequent broadcast 160, program recording controller 106 only records the segment of subsequent broadcast 160 specified as "unit 2" and inserts the recorded segment into program A recording 130 as unit 2 182. Program completion controller 108 detects the insertion of unit 2 182 into program A recording 130, computes a check value 184 for unit 2 182, compares check value 184 against data integrity value 164, and if there is a match between check value 184 and data integrity value 164, does not set flag 186. In addition, program completion controller 108 deletes unit 2 134, to remove the incomplete unit of the program. In the example, if program completion controller 108 were to set flag 186, program completion controller 108 would repeat the process of searching compiled program schedule 154 for another subsequent broadcast of "program A" and, if another subsequent broadcast is identified, set scheduled recordings 156 to include a scheduled recording of "unit 2" of the another subsequent broadcast of "program A".

In the example, by identifying whether a program is complete on a unit by unit basis, program completion controller 108 may apply checksum functions to segments of recorded data smaller than the entire program, which increases the accuracy of the use of checksum functions to identify whether there are any data errors in recorded data. In addition, when data in a program is checked in smaller segments, program completion controller 108 may use available memory resources to apply a checksum function that is more complex than would be available for the entire program, and therefore provides greater accuracy in checking for errors for the program as a whole. In addition, by a program broadcaster sending unit identifiers for each unit of the program and data integrity values correlated with each unit of the program, program completion controller 108 is enabled to detect the position of specific segments of a program that are incomplete and to schedule the recording of only those specific segments of a program that are incomplete, including scheduling recording of a segmented unit of a program in the middle of the program and including scheduling recordings of multiple segments of a program that are not consecutive units. In addition, by detecting a particular unit of a program that is incomplete, only the selected unit of a previously recorded program needs to be recorded during a subsequent broadcast of the program and used to replace the previously incomplete unit of the program, which minimizes the bandwidth, computational resources, and storage resources required to complete a previously incomplete program.

In the example, there are many reasons why a program recording by program receiver 104 may be incomplete within one or more units of the program. In one example, the equipment implemented by program broadcaster 102 to broadcast a program may fail or introduce errors in the broadcast, which would cause program receiver 104 to receive an incomplete broadcast of a program and therefore, any recordings of the broadcast of the program would also be incomplete. In another example, the transmission, network, and wiring infrastructure between program broadcaster 102 and program receiver 104 may fail or introduce errors in the broadcast of a program, which may cause the program receiver 104 to receive an incomplete broadcast of a program and therefore, any recordings of that program would also be incomplete. In another example, the device executing program receiver 104 may fail or introduce errors when receiving a broadcast of a program or recording the broadcast of the program, which would cause program receiver 104 to store an incomplete recording of the broadcast of the program. In each of these examples, regardless of the point at which failure or error is introduced and the portion of the program in which the failure or error is introduced during, program completion controller 108 identifies the units of the recorded program that are incomplete by using the unit identifiers specified for the program to identify recorded units of the program and checking each recorded unit of a program against a data integrity value specified for each program unit by the program broadcaster.

In addition, in each of these example, regardless of the point at which the failure or error is introduced and the portion of the program in which the failure or error is introduced during, program completion controller 108 identifies errors on a unit by unit basis, schedules recordings of the incomplete units alone during a subsequent broadcast of the program or program units, and replaces the incomplete units of a program with newly recorded units of the program, to provide a user with a complete recording of the program without having to rerecord the entire program. In recording devices implementing program receiver 104 where the number of channels that can simultaneously be recorded is limited and the amount of storage space for recording programs is limited, reducing the amount of time required for rerecording programs to a unit by unit basis and reducing the amount of space required for completing program recordings to a unit by unit basis, minimizes the impact of on recording bandwidth and recording storage space for the functions performed by program completion controller 108.

Figure 2:
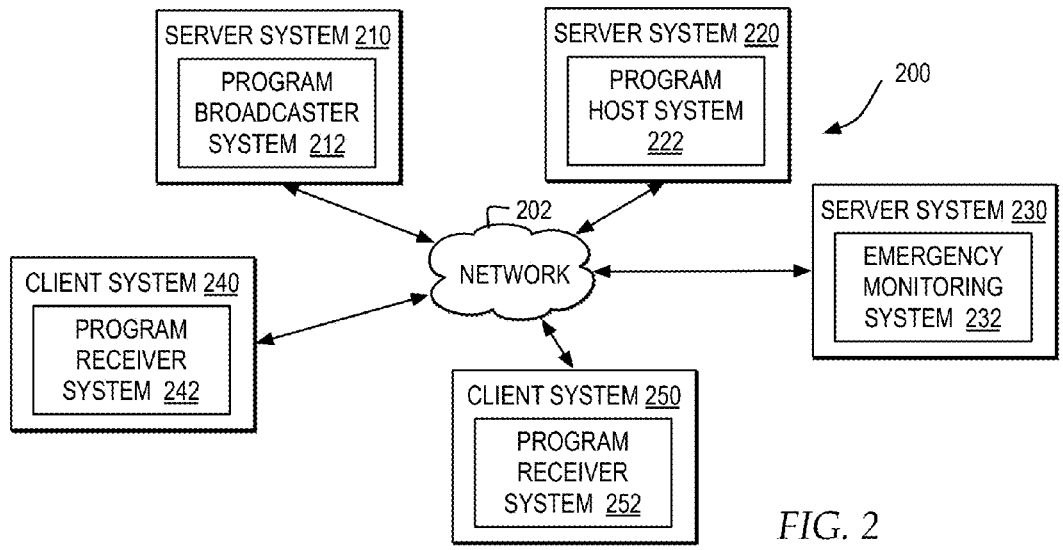
FIG. 2 is a block diagram illustrating one example of a network environment in which a program broadcaster and program receiver are implemented.

With reference now to FIG. 2, a block diagram illustrates one example of a network environment in which a program broadcaster and program receiver are implemented. One of ordinary skill in the art will appreciate that environment 200 is illustrative of one type of network environment that may support clients, servers and other components of a broadcast system and communication system. In addition, one of ordinary skill in the art will appreciate that the distribution of systems within network environment 200 is illustrative of a distribution of systems, however, other distributions of systems within a network environment may be implemented.

As illustrated, multiple systems within network environment 200 may be communicatively connected via network 202, which is the medium used to provide communications links between various devices and computer systems communicatively connected. Network 202 may include permanent connections such as wire or fiber optics cables and temporary connections made through telephone connections and wireless transmission connections, for example, and may include routers, switches, gateways and other hardware to enable a communication channel between the systems connected via network 202. Network 202 may represent one or more of broadcast television networks, including cable, satellite, and internet based television networks across which programs are transmitted, packet-switching based networks, telephony based networks, local area and wire area networks, public networks, and private networks. Network environment 200 may implement multiple types of network architectures.

Network 202 and the systems communicatively connected within network environment 200 via network 202 may implement one or more layers of one or more types of network protocol stacks which may include one or more of a physical layer, a link layer, a network layer, a transport layer, a presentation layer, and an application layer. For example, network 202 may implement one or more of the Transmission Control Protocol/Internet Protocol (TCP/IP) protocol stack or an Open Systems Interconnection (OSI) protocol stack. In addition, for example, network 202 may represent the worldwide collection of networks and gateways that use the TCP/IP suite of protocols to communicate with one another.

In the embodiment, as illustrated, a client system 240 and a client system 250 are communicatively connected via network 202 to one or more of a server system 210, a server system 220, and a server system 230. Each of client system 240, client system 250, server system 210, server system 220, and server system 230 may represent one or more computer systems, such as computer system 700 of FIG. 7, to be described below.

In one example, client system 240 hosts a program receiver system 242 and client system 250 hosts a program receiver system 252, where program receiver system 242 and program receiver system 252 each represent instances of program receiver 104, for one or more subscribers. In the example, server system 210 hosts program broadcaster system 212, where program broadcaster system 212 represents an instance of program broadcaster 102. In the example, program broadcaster system 212 may simultaneously broadcast or stream multiple programs on different channels and program receiver system 242 and program receiver system 252 may each receive one or more channels for playback and recording of the programs currently broadcast on the channels.

In the example, server system 220 hosts program host system 222, where program host system 222 hosts one or more recordable sources of one or more programs in response to program receiver system 242 or program receiver system 252 requesting the recordable source of the one or more programs. In the example, program host system 222 may host recordable sources of one or more programs by providing live streams, on-demand streams, on-demand downloads, scheduled downloads, viewable media, program playback, and other recordable or viewable sources of program media. In addition, program host system 222 may host recordable sources of one or more programs by providing broadcasts of programs.

In one example, program broadcaster 212 pushes programs on channels that are then received and selectively accessed by program receiver system 242 and program receiver system 252 and may push scheduling information and other data to each of program receiver system 242 and program receiver system 252. In one example, program receiver system 242 and program receiver system 252 push requests for specific content to program host system 222 and program host system 222 delivers schedules, returns responses to the requests with the requested recordable media or error messages if the requested content is not available. In another example, program receiver system 242 and program receiver system 252 may also send requests to program broadcaster system 212 and program host system 222 may push data to program receiver system 242 and program receiver system 252.

In one example, client system 240 and client system 250, executing program receiver system 242 and program receiver system 252, respectively, may represent stand-alone recording devices, such as stand-alone DVR devices and gaming devices with program recording controller 106 and program completion controller 108 embedded within the devices. In another example, client system 240 and client system 250 may represent general computer systems executing program receiver system 242 and program receiver system 252, respectively, through a browser or other interface, running program recording controller 106 and program completion controller 108 as functions of the browser or other interface, as plug-ins, as stand-alone functions, or as other executable components of the computer system. In one example, each of server system 210, server system 220, and server system 230 may represent a networked environment including multiple server systems.

In one example, program broadcaster system 212 publishes a schedule that specifies the times and dates of scheduled upcoming program broadcasts on one or more channels and may also include a list of program broadcasts available on-demand, in response to a user request to view the program. In addition, in one example, program host system 222 provides a schedule representing a directory or searchable listing of recordable sources of programs and whether the recordable sources are available immediately, on-demand, or scheduled for availability at a particular time. Each of program broadcaster system 212 and program host system 222 may push scheduling information to one or more client systems, including program receiver system 242 and program receiver system 252, and each of program broadcaster system 212 and program host system 222 may send scheduling information in response to pull requests for scheduling information from client system 240 and client system 250. In one example, the scheduling information provided by each of program broadcaster system 212 and program host system 222 may include one or more of unit identifiers for the units of a program and data integrity values for units of a program. In one example, if program receiver system 242 or program receiver system 252 receive a schedule from program host system 222, each program receiver system may filter the schedule to only include recordable sources of a program of a type that are supported by and recordable by the recording functions of the program receiver system. In one example, program receiver system 242 and program receiver system 252 may each support the recording of one or more types of other recordable sources available from program host system 222, such as program receiver system 242 including a component for recording a program from a live stream of the program by program host system 222 and program receiver system 252 including a component for recording program files downloadable from program host system 222. Each of program receiver system 242 and program receiver system 252 may include additional components for converting recordings made from recordable sources hosted by program host system 222 into a data format that can be integrated into and played back with the program recording made from a broadcast of the program by program broadcaster system 212.

In one example, program receiver system 242 and program receiver system 252 may record broadcasts of programs from program broadcast system 212 and program host system 222 and may also record other programs that are accessible from program broadcast system 212 and program host system 222. In the example, each of program receiver system 242 and program receiver system 252 may include a program completion controller, such as program completion controller 108, for detecting unit identifiers and data integrity values for each program, checking data integrity values against the recorded units of a program as specified by the unit identifiers, and setting a flag for any recorded unit of a program that includes an error. In addition, each of program receiver system 242 and program receiver system 252 may include program completion controller 108 for searching the scheduling information available from one or more of program broadcaster system 212 and program host system 222, to identify whether the program as a whole or the incomplete units of the program are scheduled to be broadcast again or are available from another recordable source, and, if available, then automatically schedule a recording of the incomplete units only. Each of program receiver system 242 and program receiver system 252 may include program completion controller 108 for automatically replacing the incomplete recorded units of a program with the newly recorded units of a program, checking the newly recorded units of the program for completeness, and deleting the previously recorded incomplete recorded units of the program.

In one example, program receiver system 242 and program receiver system 252 may each support a graphical user interface through which a user may view schedule information, select to record programs from the schedule information, view the status of each recorded program as incomplete or complete, and specify preferences for managing incomplete recorded programs. In addition, the graphical user interface may provide additional or alternate interfaces and information.

In one example, program receiver system and program receiver system 252 may also report information about incomplete recorded units to one or more of program broadcaster system 212, program host system 222, and an emergency monitoring system 232. Each of the systems receiving information about incomplete recorded units may collect the information from multiple client systems, and analyze the information, to track patterns, make decisions, and automate actions.

Figure 3:
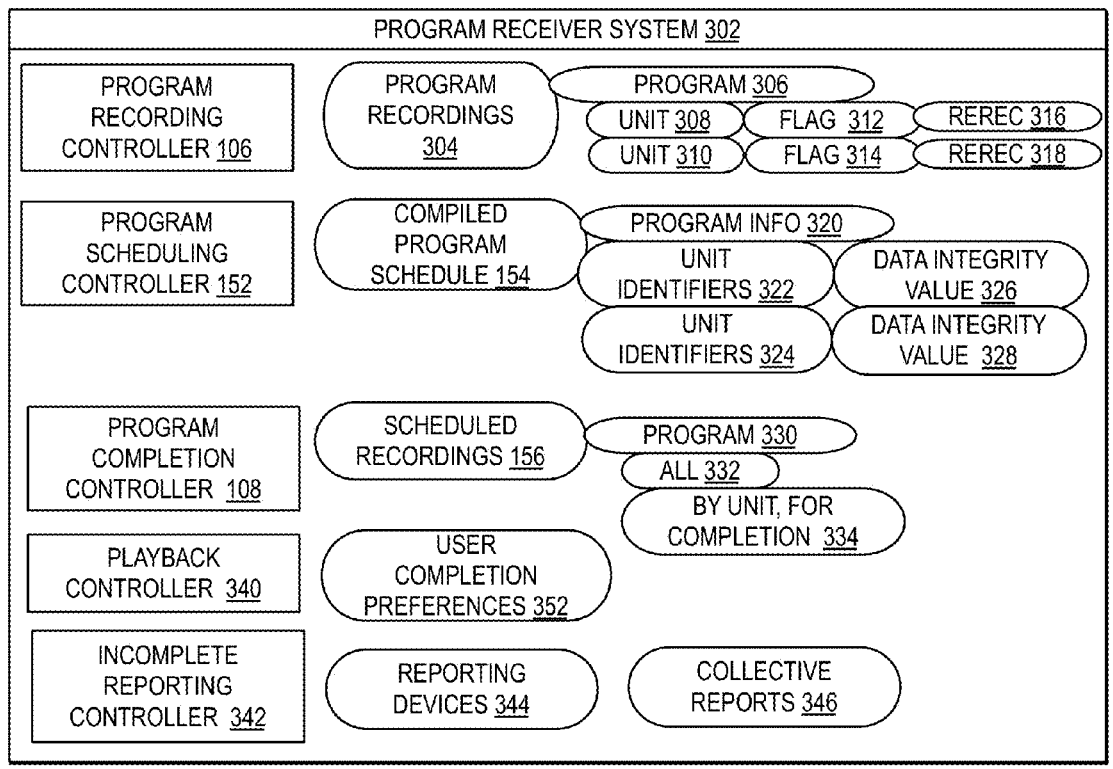
FIG. 3 is a block diagram illustrating one example of components of a program receiver system including a program completion controller for identifying incomplete units from among multiple units of a recording of a program broadcast and for managing recording of incomplete units to provide a complete program recording.

FIG. 3 illustrates a block diagram of one example of components of a program receiver system including a program completion controller for identifying incomplete units from among multiple units of a recording of a program broadcast and for managing recording of incomplete units to provide a complete program recording.

In the example, a program receiver system 302 includes program scheduling controller 162, which accesses program schedule information from one or more program broadcaster systems, program host systems, and other systems enabled to provide program receiver system 302 with access to programs, and compiles the program schedules into compiled program schedule 154. Each scheduled program may include program info 320 including, but not limited to, a scheduled time and date or on-demand availability, a program name and number, and episode name and number, and other information identifying the particular scheduled program. In addition, program information 320, for one or more programs, may include unit identifiers including time stamps, durations, order, and other information for identifying a segment of a program, such as unit identifiers 322 and unit identifiers 324. In addition, program information 320, for one or more programs, may include one or more data integrity values specified for each of the unit identifiers, such as a data integrity value 326 for unit identifiers 322 and a data integrity value 328 for unit identifiers 324. Moreover, if program information 320 is received from program host system 222 or other host of recordable sources of programs, program information 320 may include a recordable source type, including, but not limited to, live stream, on-demand stream, and on-demand download. In the example, program scheduling controller 152 may filter compiled program schedule 154 to only list recordable sources of a type supported by program recording controller 106 of program receiver system 302.

In the example, program receiver system 302 includes program recording controller 106 for making recordings of program broadcasts and other recordable sources and storing the recordings in program recordings 304. In one example, program recording controller 106 may make recordings of broadcasts by recording the data broadcast on a particular television channel. In another example, program recording controller 106 may make recordings of other recordable sources by capturing the playback of a recordable source or downloading a file of a recordable source and retrieving the portion or portions of program requested for the recording from captured or downloaded recordable source.

In one example, each program broadcast recording stored in program recordings 304, such as program 306, may be stored as identified by unit identifiers for the program, into one or more units, such as unit 308 and unit 310. In addition, program completion controller 108 may set one or more flags with each of the one or more units for each program identified as incomplete, such as flag 312 for unit 308 and flag 314 for unit 310. In particular, as described with reference to FIG. 1, during or subsequent to program recording controller 106 recording a program broadcast into program recordings 304, program completion controller 108 may analyze the program recording to identify units of the program according to unit identifiers specified by the program broadcaster, such as unit identifiers 322 and unit identifiers 324, and may check each unit of the program against a data integrity value specified for the unit by the program broadcaster, such as data integrity value 326 and data integrity value 328. If program completion controller 108 detects an error when checking a unit of a program against a data integrity value received for the unit, then program completion controller 108 sets a flag for the unit, such as by setting flag 312 for unit 308 or flag 314 for unit 310.

Program completion controller 108 responds to each flag set for each program unit by searching compiled program schedule 154 for one or more subsequent scheduled broadcasts or other options to access the incomplete program units. If program completion controller 108 identifies a subsequent scheduled broadcast of the incomplete program units within compiled program schedule 154, program completion controller 108 automatically schedules a recording of the incomplete program units during the subsequent scheduled broadcast in scheduled recordings 156. Each scheduled recording within scheduled recordings 156 may identify a particular program 330, by time, date, unique number, or other identifier, along with identifying whether all of the program should be recorded as illustrated at reference numeral 332 or whether the program should be recorded by unit, for only a selection of the total units, for completing a previously recorded broadcast of the program, as illustrated at reference numeral 334. In the example, in scheduling incomplete program units from program 306 to be rerecorded in scheduled recordings 156, program completion controller 108 may identify one or more broadcasts or one or more broadcast sources for rerecording each of the incomplete units and schedule a single recording in scheduled recordings 156 identifying multiple incomplete units or schedule a separate program recording in scheduled recordings 156 for each incomplete unit.

If program completion controller 108 does not identify any subsequent scheduled broadcasts or other options to access the program or the incomplete program units within compiled program schedule 154, then program completion controller 108 may trigger program scheduling controller 152 to query program broadcaster systems and program host systems, such as program broadcaster system 212 and program host system 222, for scheduling updates and may request a rebroadcast of the incomplete program units from program broadcaster system 212 and program host system 222.

In the example, for each unit of program 306, if a flag is set for the unit, an additional rerec status may be set to indicate whether the incomplete unit is scheduled to be rerecorded. In the example, a rerec status 316 is set if flag 312 is set to incomplete and a rerec status 318 is set if flag 314 is set to incomplete. If program completion controller 108 is able to schedule a rerecording of an incomplete program unit for a program, then the rerec status for the incomplete unit is set to indicate that a rerecording of the incomplete unit is scheduled. Each of rerec status 316 and rerec status 318 may also indicate the scheduled time for rerecording each incomplete unit.

In one example, program completion controller 108 may apply a checksum function or other data integrity function to determine whether checksum calculated for a recorded unit of a program matches the data integrity value for the unit of the unit of the program. In addition, program completion controller 108 may use the checksum function or a digital compensation function to analyze the corruption level of the errors in the recording of each program unit when attempting to put together frames of the program. In one example, program completion controller 108 may calculate a corruption level before or during playback of a program that indicates the level of corruption of data on a scale from 1 to 10, with a "9" meaning there is a slight pixilation of data calculated by the digital compensation function and a "2" meaning the image is not watchable when processed by the digital compensation function. The corruption level calculated by program completion controller 108 may represent the number of blocks of corrupted recording along with the level of corruption on the scale.

A playback controller 340 controls a graphical user interface for a user to view program recordings 304 and to selectively manage playback of programs from program recordings 304. In the example, when a flag is set for one or more units of a program in program recordings 304, in a graphical interface displaying a selectable entry to playback the program, playback controller 340 may graphically distinguish the selectable entry for the program. In addition, in the example, when a flag is set for one or more units of a program in program recordings 304, playback controller 340 may also identify a context of each flagged unit of the program, from program info 320 or other information accessible to program receiver system 302, and graphically distinguish different contexts within the flagged unit. In addition, in the example, when a flag is set for one or more units of a program in program recordings 304, playback controller 340 may identify the relative position of the flagged unit within the program and the length of the flagged unit from the unit identifiers for the units of the program and graphically show the relative position and length of the flagged unit within the program. Moreover, in the example, playback controller 340 may also graphically indicate the status of recording setting 316 for each recording with flagged units, graphically distinguishing between incomplete program units with a rerec status indicating the incomplete program units that are not scheduled to be completed and with a rerec status indicating the incomplete program units that are scheduled to be completed. Playback controller 340 may also graphically indicate the corruption status of an incomplete unit within a playback interface by showing the corruption level of portions of a program within a timebar showing the position of the current frame within the sequence of frames of the program.

When program completion controller 108 replaces a flagged unit with a newly recorded unit that is not flagged as incomplete, playback controller 340 may adjust the graphical display of the selectable entry for the program to indicate that the program unit was previously incomplete, but is now complete. In addition, playback controller 340 may mark each start and end position of each previously flagged, incomplete unit, after one or more incomplete units are replaced with complete units, and enable a search option for a user to automatically forward to the start or end position of each replaced unit, such that if a user has previously played back the incomplete recording, once at least one incomplete unit of the recording is replaced with a complete unit, the user may select to view the program and automatically forward to the previously incomplete units during playback.

In the example, user completion preferences 352 may further specify a user's preferences for program completion controller 108 and playback controller 340. In one example, a user may set a preference in user completion preferences 352 for program receiver system 302 to automatically attempt to rerecord incomplete units of particular programs or particular types of programs, but to wait for a user to request rerecording of incomplete units of any other programs. In another example, a user may set a preference in user completion preferences 352 for how graphical indicators of incomplete program units, scheduled and unscheduled incomplete program units, and other completion related graphical indicators are displayed by playback controller 340 within a user interface.

In the example, program receiver system 302 may include an incomplete reporting controller 342 for reporting information about flagged incomplete units in program recordings 304, for reporting information about rerecorded units in program recordings 304, and for reporting additional or alternate information recorded by program receiver system 302. In the example, reporting devices 344 may specify one or more systems to which incomplete reporting controller 342 is set to report information including, but not limited to, program broadcaster system 212, program broadcaster system 222, and emergency monitoring system 232. In addition, incomplete reporting controller 342 may request information collected from multiple subscribers about incomplete units from one or more of program broadcaster system 212, program host system 222, and emergency monitoring system 230 and receive collective reports 346 specifying statistical information program units that have been reported as incomplete by other subscribers in the region. In the example, playback controller 340 may integrate collective reports 346 into one or more interfaces to provide a subscriber with statistical information about incomplete unit reporting by a group or region of subscribers.

Figure 4:
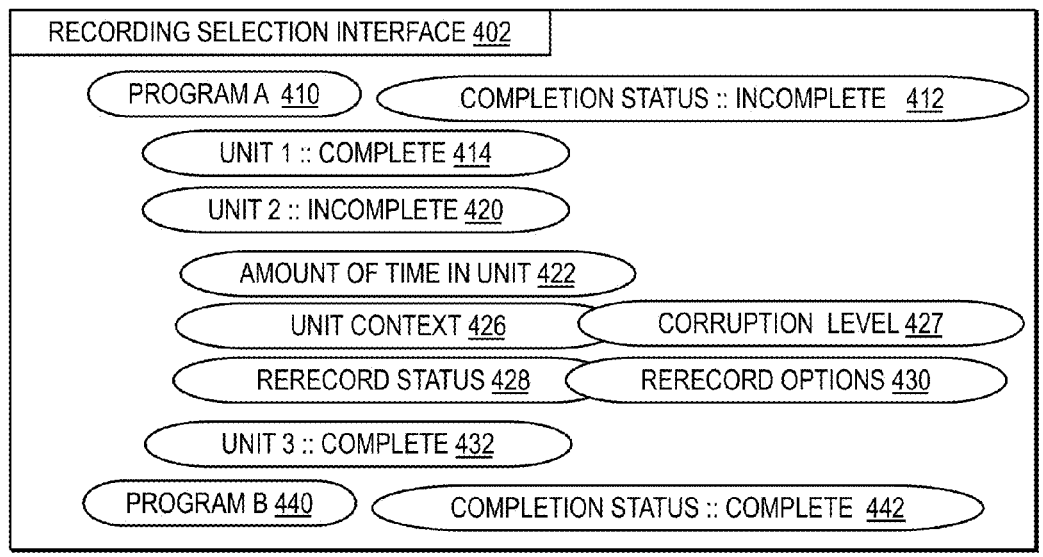
FIG. 4 is a block diagram illustrating one example of a recording selection interface for identifying one or more recorded programs available for playback and a completion status of each of the one or more recorded programs.

FIG. 4 illustrates a block diagram of one example of a recording selection interface for identifying one or more recorded programs available for playback and a completion status of each of the one or more recorded programs.

In the example, a recording selection interface 402 illustrates multiple selectable entries for programs recorded from program broadcasts by a recording device and available for selection for playback. In the example, recording selection interface 402 illustrates a selectable entry for program A 410, selectable for playback of "program A", and a selectable entry for program B 440, selectable for playback of "program B". In additional or alternate embodiments, recording selection interface 402 may include additional or alternate selectable entries and may include additional or alternate graphical indicators of each selectable entry.

In the example, recording selection interface 402 includes a completion status graphically displayed with each selectable program entry. In one example, a completion status 412 indicates that the recording of program A 410 is incomplete. In another example, a completion status 442 indicates that the recording of program B 440 is complete.

In the example, along with completion status 412 indicating that the recording of program A 410 is incomplete, each unit of program A 410 is further graphically distinguished to indicate whether the unit is flagged as complete or incomplete. In the example, unit 1 status 414 indicates that "unit 1" of "program A" is complete, unit 2 status 420 indicates that "unit 2" of "program A" is incomplete, and unit 3 status 432 indicates that "unit 3" of "program A" is complete.

In the example, along with unit 2 status 420 indicating the recording of "unit 2" of "program A" is incomplete, "unit 2" is further graphically distinguished to indicate additional information about the unit. In the example, the additional information illustrated under unit 2 status 420 includes an indicator of the amount of time in unit 422, unit context 426, a corruption level 427, and rerecord status 428. In the example, unit context 426 may indicate a context of the content of "unit 2" including, but not limited to, advertising, live event, or new content. In the example, rerecord status 428 may indicate whether "unit 2" is scheduled for rerecording, along with the scheduled time for the rerecording, or whether "unit 2" is not available for rerecording. Recording selection interface 402 may also include rerecord options 430 that are specified for the content of rerecord status 428. For example, if rerecord status 428 indicates that "unit 2" is scheduled for rerecording, rerecord options 430 may include a selectable option for a user to select to cancel the rerecording of "unit 2" or select between multiple rebroadcast times. In another example, if rerecord status 428 indicates that "unit 2" is not scheduled for rerecording, rerecord options 430 may include a selectable option for a user to submit feedback about the incomplete recording to the program broadcaster. Corruption level 427 may indicate an average or range of corruption levels of the incomplete unit on a corruption scale, where a corruption level of "2" may indicate that there is insufficient data for a digital compensation algorithm to put together frames of data and a corruption level of "9" may indicate that there is sufficient data for the digital compensation algorithm to put together frames of data, but that there may be pixilation of the data.

In the example, a user may view the amount of time in a unit marked as incomplete, the context of the unit marked as incomplete, and the corruption level of a unit marked as incomplete and determine, via rerecord options 430, whether to change the completion settings for an incomplete unit. For example, if "unit 2" is only thirty seconds long, "unit 2" is an recap of a previous program, or "unit 2" is only at a corruption level of "2", while "unit 2" is considered incomplete, the user may elect to through rerecord options 430 not to request that the incomplete unit be rerecorded and the user may elect to watch the incomplete unit as-is.

Figure 5:
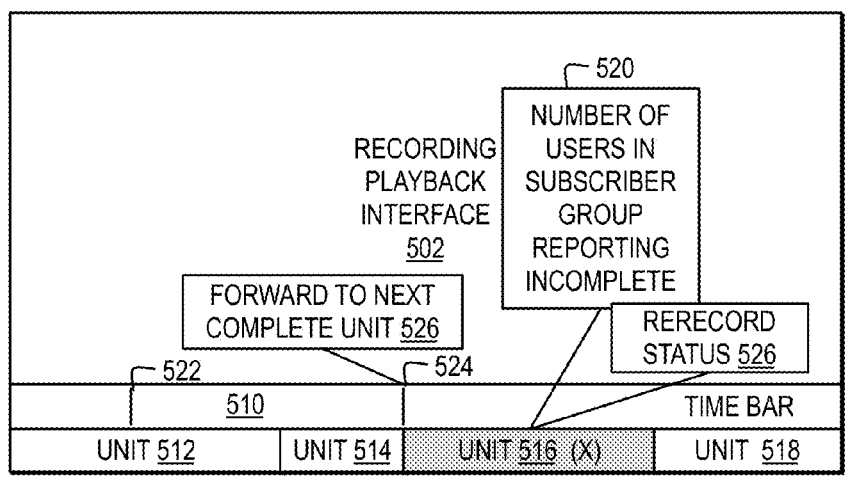
FIG. 5 is a block diagram illustrating one example of a recording playback interface illustrating a graphical display of a recording identified with an incomplete unit.

FIG. 5 illustrates a block diagram of one example of a recording playback interface illustrating a graphical interface for playback of a recording identified with an incomplete unit. In the example, a recording playback interface 502 provides an interface in which a recorded program plays. In the example, a time bar 510 includes a marker reflecting the time stamp of the portion of the program currently playing in recording playback interface 502. In addition, time bar 510 may include graphical indicators of each unit of the multiple units of the program within time bar 510, or as illustrated, positioned below time bar 510. In the example, the recorded program currently playing within recording playback interface 502 includes segments identified as a unit 512, a unit 514, a unit 516, and a unit 518. In the example, unit 516 has been flagged as an incomplete unit. Unit 516 is shaded, graphically and includes an "X" to distinguish unit 516, which is an incomplete unit, from unit 512, unit 514, and unit 518, which are complete units.

In one example, at position 522, the marker within time bar 510 reflects that the program playback is during the segment identified as unit 512. In the example, once the marker within time bar 510 reaches a position 524, at the start of unit 516, multiple options may be presented to the user within recording playback interface 502, or within time bar 510. In one example, when the marker within time bar 510 reaches position 524, a selectable option 526 may be displayed which when selected automatically forwards the playback marker to the next complete unit. In another example, when a user selects a forward option while the marker within time bar is within the time specified for unit 516, the option to automatically forward the playback marker to the next complete unit may be triggered. In addition, in the example, when the marker within time bar 510 reaches position 524, playback controller 340 may provide the user with information from collective reports 346, specified for the particular program, such as through graphical display 520, which indicates the number of users in the subscriber group reporting the incomplete unit. In addition, in the example, when the marker within time bar 510 reaches position 524, playback controller 340 may provide the user with the rerecord status for the unit, as illustrated at reference numeral 526, graphically distinguishing between a rerecord status indicating "rerecording scheduled" and "rerecording not available".

Figure 6:
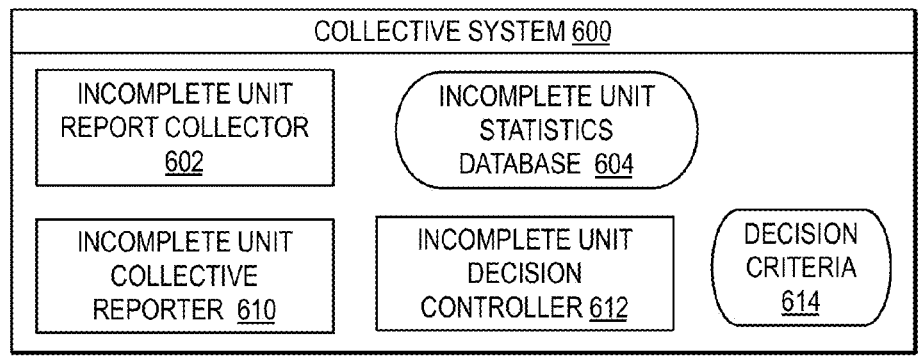
FIG. 6 is a block diagram illustrating one example of a collective system for receiving incomplete unit reports from multiple subscriber receiver systems, analyzing the incomplete unit reports, and performing one or more actions based on the analyzed incomplete unit reports.

FIG. 6 illustrates a block diagram of one example of a collective system for receiving incomplete unit reports from multiple subscriber receiver systems, analyzing the incomplete unit reports, and performing one or more actions based on the analyzed incomplete unit reports.

In one example, a collective system 600 may be implemented within one or more of program broadcaster system 212, program host system 222, emergency monitoring system 232, and other systems enabled to receive incomplete unit reports from program receiver systems for one or more subscribers via network 202. In one example, collective system 600 may include an incomplete unit report collector 602 for receiving incomplete unit reports from one or more program receiver systems or other systems, extracting information from the incomplete unit reports, identifying additional information about each program receiver system based on subscriber account information, and storing the extracted information from the incomplete unit reports and additional information about each program receiver system in incomplete unit statistics database 604. Incomplete unit report collector 602 may perform additional analysis of the information stored in incomplete unit statistics database 604 to calculate statistical percentages of one or more data components including, but not limited to, program identifier, incomplete unit identifier, region, subscriber group, time period, and other components extracted from incomplete unit reports and subscriber account information.

In one example, collective system 600 also includes an incomplete unit collective reporter 610 for handling requests for collective reports received from one or more program receiver systems. In one example, a program receiver system may submit a request for one or more collective reports for a particular program identifier, unit identifier, region, subscriber group, time period, or other component. Incomplete unit collective reporter 610 searches incomplete unit statistics database 604 with the request criteria and returns the results to the program receiver system in a collective report. In another example, incomplete unit collective reporter 610 may also receive a subscription request from a program receiver system requesting that collective reports be periodically pushed to the program receiver system and incomplete unit collective reporter 610 may periodically collect information from incomplete unit statistics database 604 and push the collected information in collective reports to the subscribing program receiver system.

In one example, incomplete unit decision controller 612 analyzes incomplete unit statistics database 604 according to decision criteria 614 and triggers automated actions in response to he analyzed information according to decision criteria 614. In the example, decision criteria 614 may be specified according to the type of system implementing collective system 600 to perform one or more services.

In one example, if collective system 600 is implemented within program broadcaster system 212, incomplete unit report collector 602 may collect the information from multiple client systems into incomplete unit statistics database 604 about incomplete recorded units. Incomplete unit decision controller 612 may apply decision criteria 614 specified to determine a number of subscribers that were not able to record a complete program, by subscriber area and by the scheduled time of the incomplete units, and make decisions about whether to schedule another broadcast of the program as a whole or of only the incomplete recorded units and whether to schedule the broadcast for a particular subscriber area or for multiple subscriber areas. In one example, where multiple program receiver systems for a group of subscribers in a particular region each report incomplete program units for a portion of a program that is a live event not scheduled for rebroadcast, incomplete unit decision controller 612 may automatically trigger program broadcaster system 212 to schedule a rebroadcast of the incomplete program units only for the particular region only. In another example, where program broadcaster system 212 provides program broadcasts via a satellite network infrastructure, if incomplete unit decision controller 612 detects that multiple program recording systems for a region are reporting incomplete units of different programs scheduled during a same period of time, incomplete unit decision controller 612 may further identify whether a weather system caused satellite broadcasts to go out based on groupings of incomplete units scheduled during an overlapping time, predict what other markets may be impacted by the same weather system, and adjust or delay a program broadcast in other markets of any live events or other programs not scheduled for rebroadcast. Incomplete unit decision controller 612 may also identify an external cause of program broadcast interference, such as a weather system, in a particular area, and sends alerts to local program broadcast systems to delay broadcasts until the control system identifies that the external cause has dissipated.

In one example, if collective system 600 is implemented within program host system 222, incomplete unit report collector 602 may collect information from multiple client systems about incomplete recorded units to determine what program units users may need to access on-demand or from a download. Incomplete unit decision controller 612 may determine, based on decision criteria 614, if the programs are not already accessible, whether to host the programs or units of the programs. In one example, program host system 222 may support access to program units through a peer-to-peer network allowing subscribers to a program broadcaster to share program units for completing previously incomplete programs.

In one example, if collective system 600 is implemented within emergency monitoring system 232, incomplete unit report controller 600 may collect incomplete program unit information from multiple client systems, or may received incomplete program unit information compiled from multiple subscribers from program broadcaster system 212 and program host system 222, along with receiving location or region information, identify locations where recordings of program broadcasts were not complete for a particular period of time, and identify what emergency conditions, such as weather, impacted the recordings of program broadcasts. Incomplete unit decision controller 612 may make decisions about rescheduling other program broadcasts in other regions that may be impacted by an ongoing emergency situation, such as a heavy storm. In addition, incomplete unit report collector 602 may collect incomplete program unit information from multiple client systems along with receiving location or region information and incomplete unit decision controller 612 may analyze the information to determine a type of emergency situation that may have occurred and automatically perform additional responses to handle the emergency situation.

Figure 7:
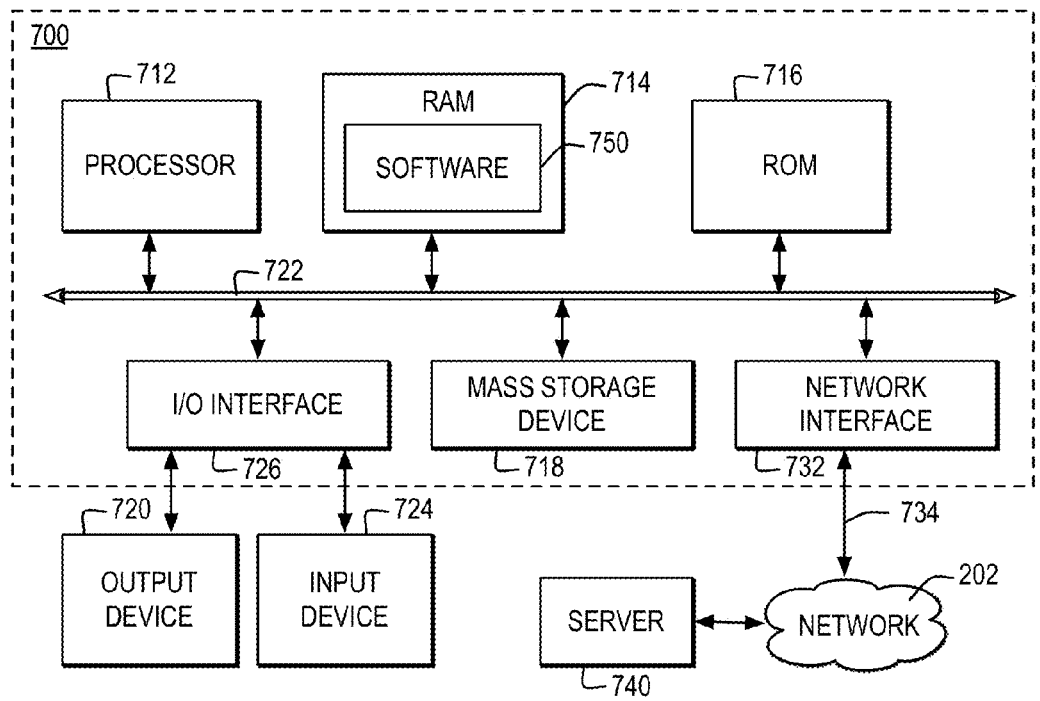
FIG. 7 is a block diagram illustrating one example of a computer system in which one embodiment of the invention may be implemented.

FIG. 7 illustrates a block diagram of one example of a computer system in which one embodiment of the invention may be implemented. The present invention may be performed in a variety of systems and combinations of systems, made up of functional components, such as the functional components described with reference to a computer system 700 and may be communicatively connected to a network, such as network 702.

Computer system 700 includes a bus 722 or other communication device for communicating information within computer system 700, and at least one hardware processing device, such as processor 712, coupled to bus 722 for processing information. Bus 722 preferably includes low-latency and higher latency paths that are connected by bridges and adapters and controlled within computer system 700 by multiple bus controllers. When implemented as a server or node, computer system 700 may include multiple processors designed to improve network servicing power. Where multiple processors share bus 722, additional controllers (not depicted) for managing bus access and locks may be implemented.

Processor 712 may be at least one general-purpose processor such as IBM® PowerPC® processor that, during normal operation, processes data under the control of software 750, which may include at least one of application software, an operating system, middleware, and other code and computer executable programs accessible from a dynamic storage device such as random access memory (RAM) 714, a static storage device such as Read Only Memory (ROM) 716, a data storage device, such as mass storage device 718, or other data storage medium. Software 750 may include, but is not limited to, code, applications, protocols, interfaces, and processes for controlling one or more systems within a network including, but not limited to, an adapter, a switch, a server, a cluster system, and a grid environment.

Figure 8:
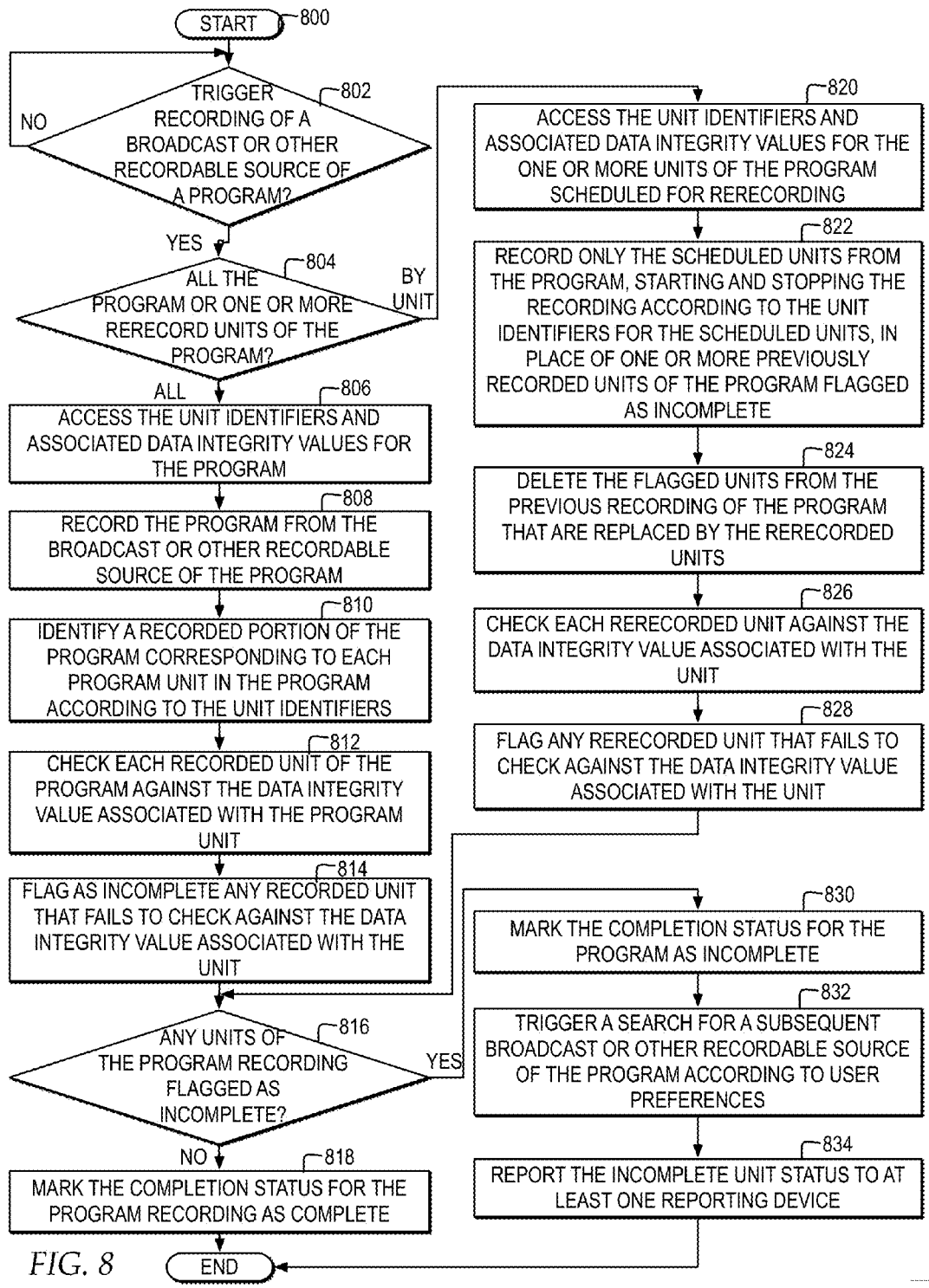
FIG. 8 is a high level logic flowchart of a process and program for identifying and rerecording incomplete units of a recording of a program broadcast.
Figure 9:
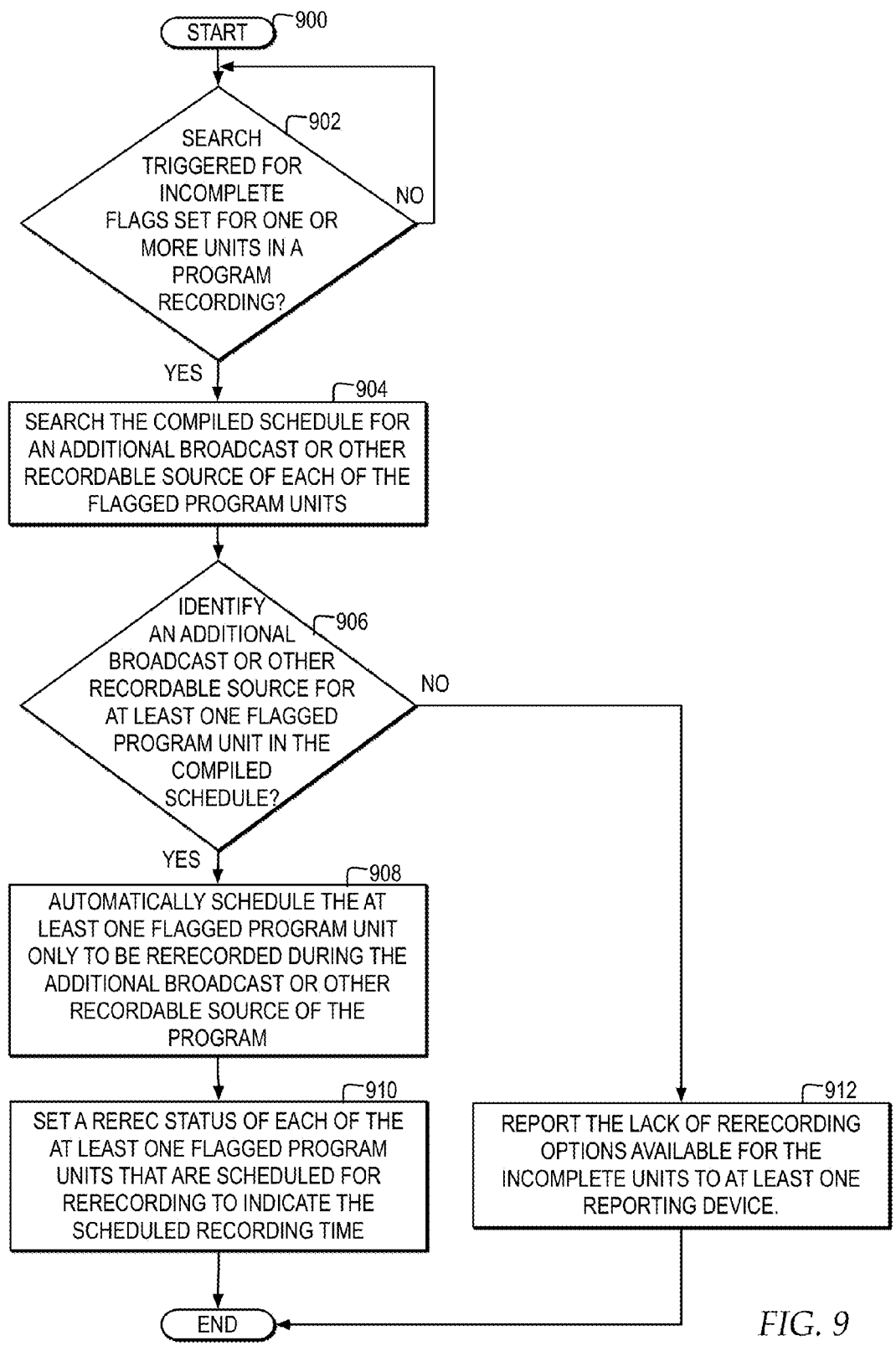
FIG. 9 is a high level logic flowchart of a process and program for searching for a rebroadcast of one or more incomplete units of a program.
Figure 10:
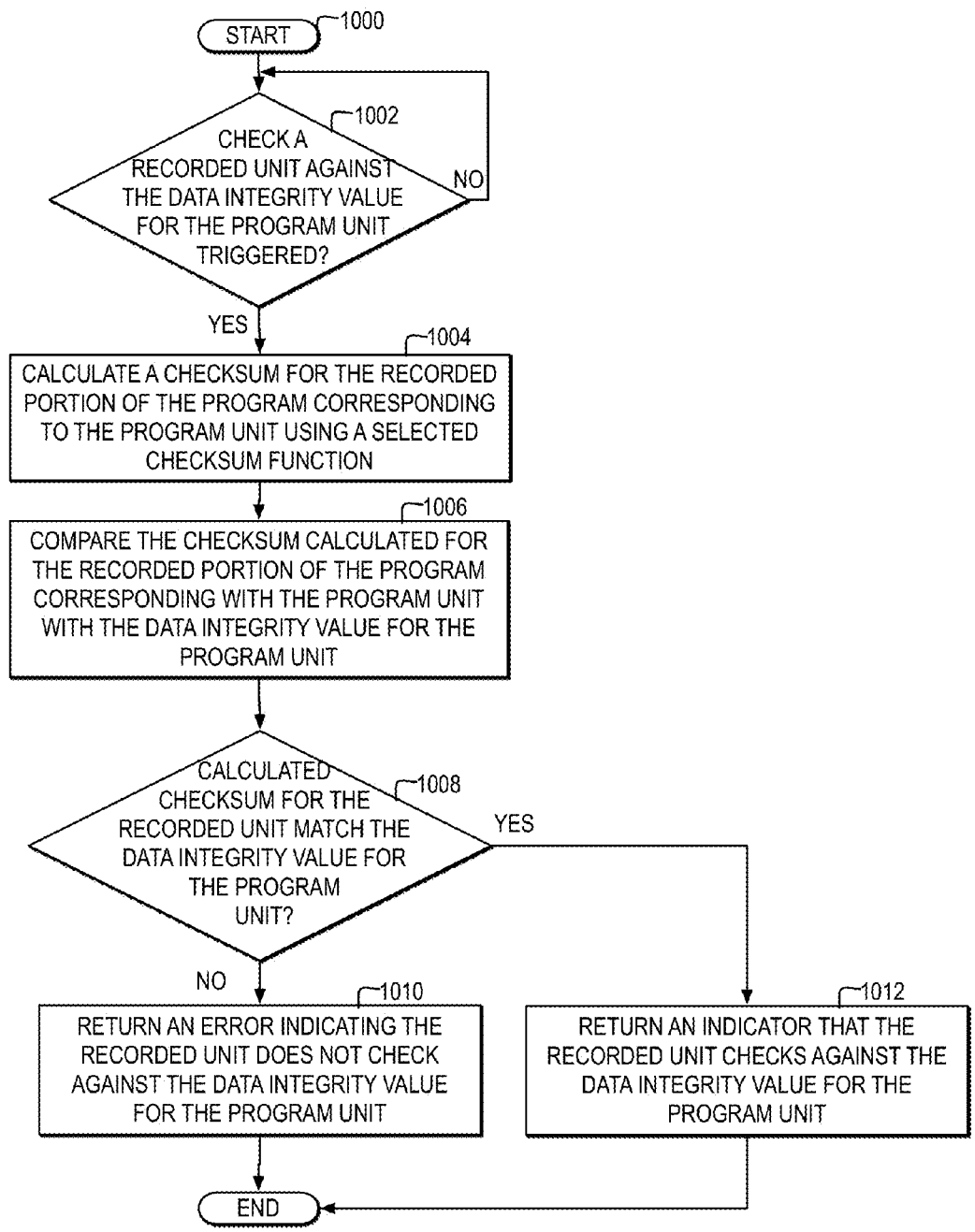
FIG. 10 is a high level logic flowchart of a process and program for checking a recorded unit of a program against a data integrity value for a program unit.

In one embodiment, the operations performed by processor 712 may control the operations of flowchart of FIGS. 8, 9 and 10 and other operations described herein. Operations performed by processor 712 may be requested by software 750 or other code or the steps of one embodiment of the invention might be performed by specific hardware components that contain hardwired logic for performing the steps, or by any combination of programmed computer components and custom hardware components. In one embodiment, one or more components of computer system 700, or other components, which may be integrated into one or more components of computer system 700, may contain hardwired logic for performing the operations of flowcharts FIGS. 8, 9, and 10.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, micro-code, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 718, a random access memory (RAM), such as RAM 714, a read-only memory (ROM) 716, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, such as computer system 700, partly on the user's computer, as a stand-alone software package, partly on the user's computer and partly on a remote computer or entirely on the remote computer or server, such as server 740. In the latter scenario, the remote computer may be connected to the user's computer through any type of network, such as network 202, through a communication interface, such as network interface 732, over a network link that may be connected, for example, to network 202.

In the example, network interface 732 includes an adapter 734 for connecting computer system 700 to network 202 through a link and for communicatively connecting computer system 700 to server 740 or other computing systems via network 702. Although not depicted, network interface 732 may include additional software, such as device drivers, additional hardware and other controllers that enable communication. When implemented as a server, computer system 700 may include multiple communication interfaces accessible via multiple peripheral component interconnect (PCI) bus bridges connected to an input/output controller, for example. In this manner, computer system 700 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 700, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 700, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 732, the network link to network 202, and network 202 may use electrical, electromagnetic, or optical signals that carry digital data streams. The signals through the various networks and the signals on network 202, the network link to network 202, and network interface 732 which carry the digital data to and from computer system 700, may be forms of carrier waves transporting the information.

In addition, computer system 700 may include multiple peripheral components that facilitate input and output. These peripheral components are connected to multiple controllers, adapters, and expansion slots, such as input/output (I/O) interface 726, coupled to one of the multiple levels of bus 722. For example, input device 724 may include, for example, a microphone, a video capture device, an image scanning system, a keyboard, a mouse, or other input peripheral device, communicatively enabled on bus 722 via I/O interface 726 controlling inputs. In addition, for example, output device 720 communicatively enabled on bus 722 via I/O interface 726 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 7 may vary. Furthermore, those of ordinary skill in the art will appreciate that the depicted example is not meant to imply architectural limitations with respect to the present invention.

FIG. 8 illustrates one example of a high level logic flowchart of a process and program for identifying and rerecording incomplete units of a recording of a program broadcast.

In the example, the process and program starts at block 800 and thereafter proceeds to block 802. Block 802 illustrates a determination whether a recording of a broadcast of a program or a recordable source of a program is triggered. In one example, a recording of a broadcast of a program or a recordable source of a program may be triggered when the scheduled recording time for the broadcast of the program or recordable source of the program is reached. When a recording of a broadcast of a program or a recordable source of a program is triggered, then the process passes to block 804. Block 804 illustrates a determination whether all of the program or only one or more units of the program are designated for recording.

At block 804, if all of the program is designated for recording, then the process passes to block 806. Block 806 illustrates accessing the unit identifiers and associated data integrity values for the program. In one example, a program broadcaster system or program host system may send unit identifiers and associated data integrity values for a program within schedule information for the program. In another example, a program broadcaster system or program host system may send unit identifiers and associated data integrity values in response to receiving a communication from a program receiver system indicating the program receiver system will record a broadcast of the program from the program broadcaster system or will record a recordable source of the program from the program host system. Next, block 808 illustrates recording the program from the broadcast of the program or from another recordable source of the program. In one example, where unit identifiers or data integrity values are embedded into the broadcast or other recordable source of the program, the unit identifiers and data integrity values may be accessed from the broadcast or other recordable source of the program, concurrent with the program recording. Thereafter, block 810 illustrates identifying a recorded portion of the program corresponding to each unit in the program according to the unit identifiers. Next, block 812 illustrates checking each recorded unit against the data integrity value associated with the program unit. In one example, block 812 may be performed at the conclusion of the recording of the entire program or may be performed multiple times, at the conclusion of the recording of each of the units of the program. In one example, to check each recorded unit against the data integrity value associated with the program unit, the process and program of FIG. 10 is triggered for each recorded unit. Thereafter, block 814 illustrates flagging any unit in the recording that fails to check against the data integrity value associated with the unit, and the process passes to block 816.

Returning to block 804, if the recording of the program is triggered on a unit basis, then the process passes to block 820. Block 820 illustrates accessing the unit identifiers and associated data integrity values for the one or more units of the program scheduled for rerecording. Next, block 822 illustrates recording only the scheduled units from the program, starting and stopping the recording according to the unit identifiers for the scheduled units, in place of one or more previously recorded units of the program flagged as incomplete. Block 824 illustrates deleting the flagged units from the previous recording of the program that are replaced by the rerecorded units. Next, block 826 illustrates checking each rerecorded unit against the data integrity value associated with the unit. Thereafter, block 828 illustrates flagging any rerecorded unit that fails to check against the data integrity value associated with the unit, and the process passes to block 816.

Block 816 illustrates a determination whether any units of a program recording are flagged as incomplete. At block 816, if no units of a program recording are flagged as incomplete, then the process passes to block 818. Block 818 illustrates marking the completion status for the program recording as complete, and the process ends. At block 816, if any units of the program recording are flagged as incomplete, then the process passes to block 830. Block 830 illustrates marking the completion status for the program recording as incomplete. Next, block 832 illustrates triggering a search for a subsequent broadcast or other recordable source of the program according to user preferences. Thereafter, block 834 illustrates reporting the incomplete unit status to at least one reporting device, and the process ends.

FIG. 9 illustrates one example of a high level logic flowchart of a process and program for searching for a rebroadcast of one or more incomplete units of a program. In the example, the process and program starts at block 900 and thereafter proceeds to block 902. Block 902 illustrates a determination whether a search is triggered for incomplete flags set for one or more units in a program recording. In the example, if a search is triggered for incomplete flags set for one or more units of a program recording, then the process passes to block 904. Block 904 illustrates searching the compiled schedule for an additional broadcast or other recordable source of each of the flagged program units. Next, block 906 illustrates a determination whether an additional broadcast or other recordable source for at least one flagged program unit is identified in the compiled schedule. At block 906, if no additional broadcast or other recordable source for at least one flagged program unit is identified in the compiled schedule, then the process passes to block 912. Block 912 illustrates reporting the lack of rerecording options available for the incomplete units to at least one reporting device, and the process ends. At block 906, if an additional broadcast or other recordable source for at least one flagged program unit is identified in the compiled schedule, then the process passes to block 908. Block 908 illustrates automatically scheduling the at least one flagged program unit to only be rerecorded during the additional broadcast or other recordable source of the program. Next, block 910 illustrates setting a rerec status of each of the at least one flagged program units that are scheduled for rerecording to indicate the scheduled recording time, and the process ends.

FIG. 10 illustrates a high level logic flowchart of a process and program for checking a recorded unit of a program against a data integrity value for a program unit. In the example, the process starts at block 1000 and thereafter proceeds to block 1002. Block 1002 illustrates a determination whether a check of a recorded unit against the data integrity value for the program unit is triggered. In the example, block 812 may trigger the process and program of FIG. 10 for each recorded unit of multiple recorded units of a program identified by multiple units. At block 1002, if a check of a recorded unit against the data integrity value for the program unit is triggered, then the process passes to block 1004. Block 1004 illustrates calculating a checksum for the recorded portion of the program corresponding to the program unit using a selected checksum function, where the checksum function calculates a numerical value from the data within the recorded portion of the program. Next, block 1006 illustrates comparing the checksum calculated for the recorded portion of the program corresponding with the program unit with the data integrity value for the program unit. Thereafter, block 1008 illustrates a determination whether the calculated checksum for the recorded unit matches the data integrity value for the program unit. At block 1008, if the calculated checksum for the recorded unit matches the data integrity value for the program unit, then the process passes to block 1012. Block 1012 illustrates returning an indicator that the recorded unit checks against the data integrity value for the program unit, and the process ends. Returning to block 1008, if the calculated checksum for the recorded unit does not match the data integrity value for the program unit, then the process passes to block 1010. Block 1010 illustrates returning an error indicating the recorded unit does not check against the data integrity value for the program unit, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A system for managing program recordings, comprising:
   a computer, comprising at least one processor, configured to check each data integrity value, from among a plurality of data integrity values each associated with a separate unit of a program comprising a plurality of units, against a separate recorded portion of a recording of the program corresponding to one of the plurality of units, wherein the recording of the program is recorded from a broadcast of the program;
   the computer, responsive to a particular data integrity value from among the plurality of data integrity values not matching when checked against a particular separate recorded portion of the program corresponding to a particular unit from among the plurality of units, configured to select to correct the recording by replacing only the particular separate recorded portion of the program from a second recording of only the particular unit from a subsequent broadcast of the program; and
   the computer configured to receive a communication comprising the plurality of data integrity values from a provider of the program.

2. The system according to claim 1, further comprising:
   the computer configured to access the subsequent broadcast of the program from a host system that provides a recordable source for the program, the recordable source for the program from among a streaming file comprising the program and a downloadable file comprising the program.

3. The system according to claim 1, further comprising:
   the computer configured to access the subsequent broadcast of the program from a broadcaster system that provides a transmission of the program across at least one television broadcast channel.

4. The system according to claim 1, wherein the computer configured to check each data integrity value, from among a plurality of data integrity values each associated with a separate unit of a program comprising a plurality of units, against a separate recorded portion of a recording of the program corresponding to one of the plurality of units, wherein the recording of the program is recorded from a broadcast of the program, further comprises:
   for each separate recorded portion of the recording of the program:
   the computer configured to calculate a checksum of the separate recorded portion of the program comprising a numerical value calculated from data within the separate recorded portion of the program; and
   the computer configured to compare the checksum with the data integrity value associated with the separate unit of the program corresponding to the separate recorded portion of the program.

5. The system according to claim 1, wherein the computer configured to check each data integrity value, from among a plurality of data integrity values each associated with a separate unit of a program comprising a plurality of units, against a separate recorded portion of a recording of the program corresponding to one of the plurality of units, wherein the recording of the program is recorded from a broadcast of the program, further comprises:

the computer configured to receive a communication identifying each of the plurality of units by a separate selection of unit identifiers for each of the plurality of units; and the computer configured to identify within the recording of the program, each separate recorded portion of the recording corresponding to one of the plurality of units according to the separate selection of unit identifiers for each of the plurality of units.

6. A system for managing program recordings, comprising:

a computer, comprising at least one processor, configured to check each data integrity value, from among a plurality of data integrity values each associated with a separate unit of a program comprising a plurality of units, against a separate recorded portion of a recording of the program corresponding to one of the plurality of units, wherein the recording of the program is recorded from a broadcast of the program; and the computer, responsive to a particular data integrity value from among the plurality of data integrity values not matching when checked against a particular separate recorded portion of the program corresponding to a particular unit from among the plurality of units, configured to select to correct the recording by replacing only the particular separate recorded portion of the program from a second recording of only the particular unit from a subsequent broadcast of the program, wherein responsive to a particular data integrity value from among the plurality of data integrity values not matching when checked against a particular separate recorded portion of the program corresponding to a particular unit from among the plurality of units, the computer configured to select to correct the recording by replacing only the particular separate recorded portion of the program from a second recording of only the particular unit from a subsequent broadcast of the program, further comprises:

the computer configured to search a schedule of a plurality of broadcast times of a plurality of programs for a scheduled time for the subsequent broadcast of the program;

the computer, responsive to identifying the subsequent broadcast of the program for the scheduled time, configured to automatically schedule a recording of the particular unit only during the subsequent broadcast of the program;

the computer, responsive to the subsequent broadcast of the program starting, configured to only record a portion of the subsequent broadcast of the program according to a selection of unit identifiers for the particular unit to replace the particular separate recorded portion of the program; and the computer configured to delete the particular separate recorded portion of the program.

7. A computer program product for managing program recordings, the computer program product comprising:

one or more computer-readable tangible storage devices;

program instructions, stored on at least one of the one or more storage devices, to check each data integrity value, from among a plurality of data integrity values each associated with a separate unit of a program comprising a plurality of units, against a separate recorded portion of a recording of the program corresponding to one of the plurality of units, wherein the recording of the program is recorded from a broadcast of the program;

program instructions, stored on at least one of the one or more storage devices, responsive to a particular data integrity value from among the plurality of data integrity values not matching when checked against a particular separate recorded portion of the program corresponding to a particular unit from among the plurality of units, to select to correct the recording by replacing only the particular separate recorded portion of the program from a second recording of only the particular unit from a subsequent broadcast of the program; and program instructions, stored on at least one of the one or more storage devices, to receive a communication comprising the plurality of data integrity values from a provider of the program.

8. The computer program product according to claim 7, further comprising:

program instructions, stored on at least one of the one or more storage devices, to access the subsequent broadcast of the program from a host system that provides a recordable source for the program, the recordable source for the program from among a streaming file comprising the program and a downloadable file comprising the program.

9. The computer program product according to claim 7, further comprising:

program instructions, stored on at least one of the one or more storage devices, to access the subsequent broadcast of the program from a broadcaster system that provides a transmission of the program across at least one television broadcast channel.

10. The computer program product according to claim 7, further comprising:

for each separate recorded portion of the recording of the program:

program instructions, stored on at least one of the one or more storage devices, to calculate a checksum of the separate recorded portion of the program comprising a numerical value calculated from data within the separate recorded portion of the program; and program instructions, stored on at least one of the one or more storage devices, to compare the checksum with the data integrity value associated with the separate unit of the program corresponding to the separate recorded portion of the program.

11. The computer program product according to claim 7, further comprising:

program instructions, stored on at least one of the one or more storage devices, to receive a communication identifying each of the plurality of units by a separate selection of unit identifiers for each of the plurality of units; and program instructions, stored on at least one of the one or more storage devices, to identify within the recording of the program, each separate recorded portion of the recording corresponding to one of the plurality of units according to the separate selection of unit identifiers for each of the plurality of units.

* * * * *